L. P. WARNER.
MACHINE FOR TONGUING AND GROOVING BOX PARTS.
APPLICATION FILED OCT. 4, 1913.

1,106,759.

Patented Aug. 11, 1914.
6 SHEETS—SHEET 1.

WITNESSES:
Robt R Kitchel
Frank E French

INVENTOR
Lea P. Warner
BY
Augustus B. Stoughton
ATTORNEY.

L. P. WARNER.
MACHINE FOR TONGUING AND GROOVING BOX PARTS.
APPLICATION FILED OCT. 4, 1913.
1,106,759.
Patented Aug. 11, 1914.
6 SHEETS—SHEET 4.
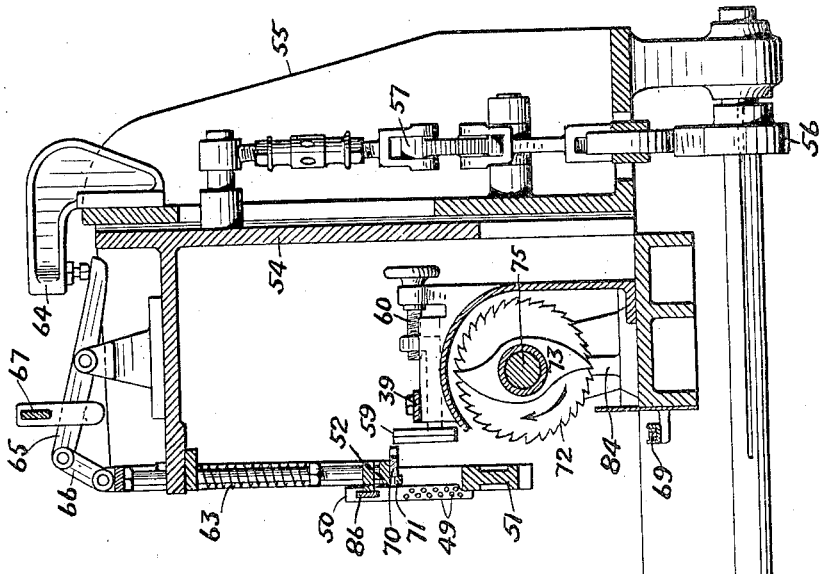
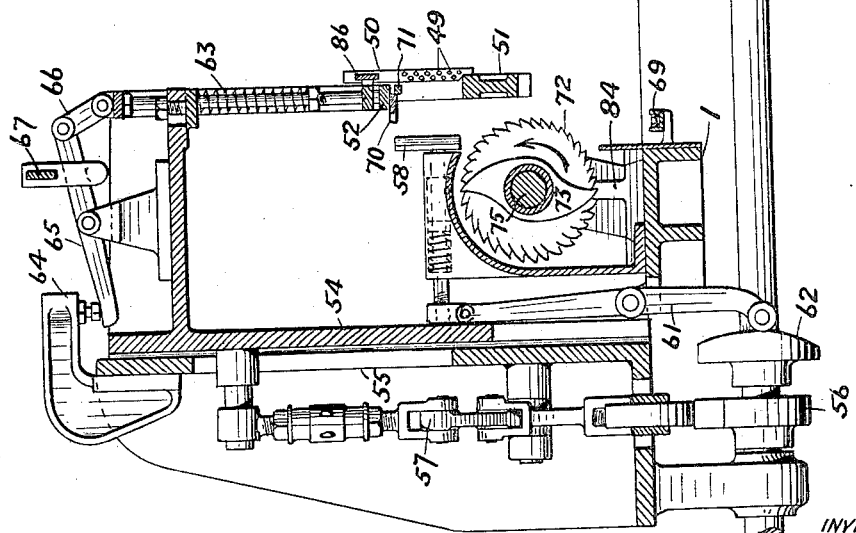
FIG. 4.
WITNESSES:
Rob R Kitchel
Frank E French
INVENTOR
Lea P. Warner
BY
Augustus B. Stoughton
ATTORNEY

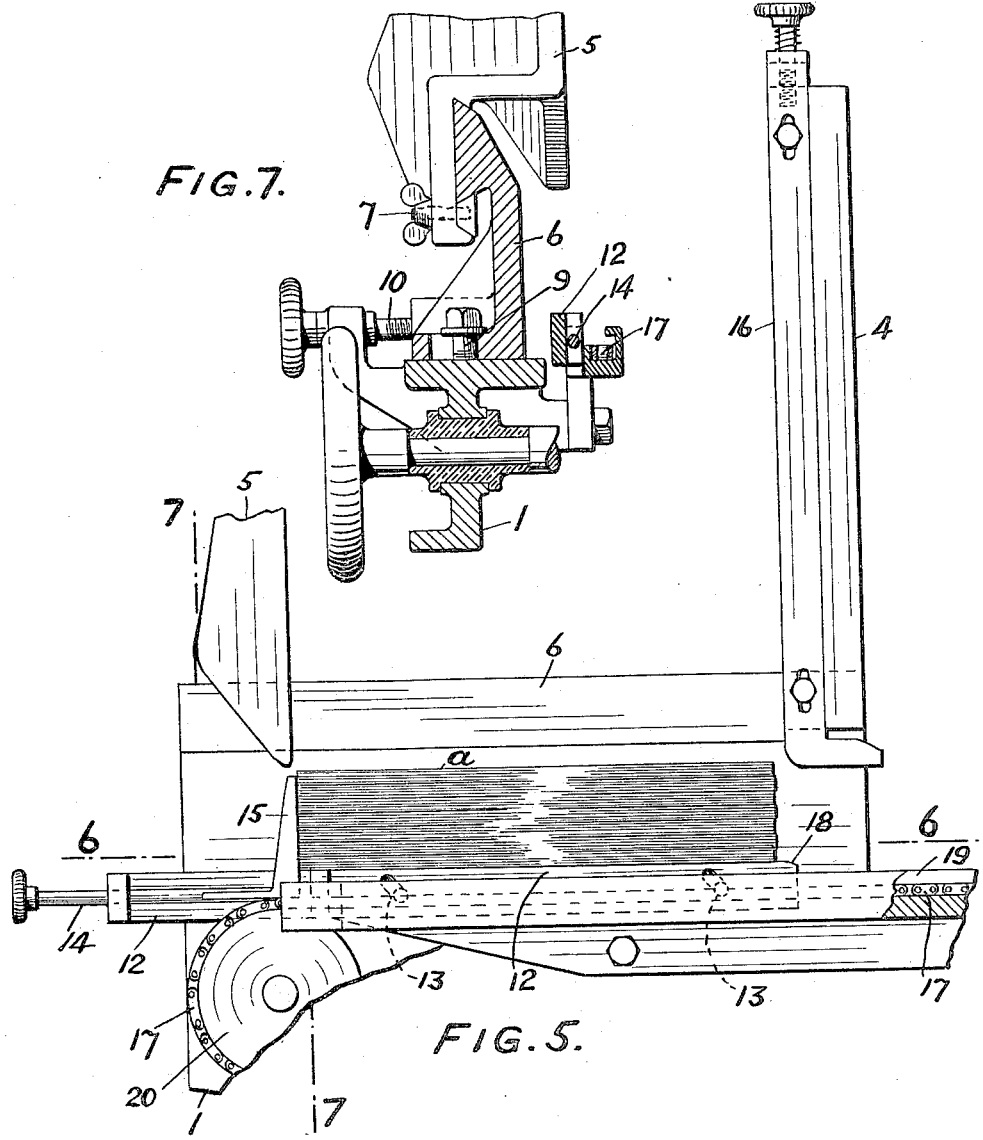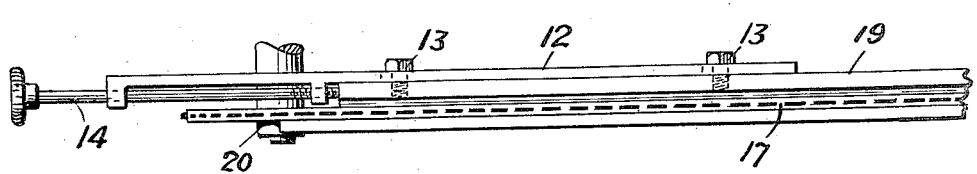

L. P. WARNER.
MACHINE FOR TONGUING AND GROOVING BOX PARTS.
APPLICATION FILED OCT. 4, 1913.

1,106,759.

Patented Aug. 11, 1914.
6 SHEETS—SHEET 6.

WITNESSES:

INVENTOR
Lea P. Warner
BY
Augustus B. Shaughton.
ATTORNEY.

UNITED STATES PATENT OFFICE.

LEA P. WARNER, OF PHILADELPHIA, PENNSYLVANIA, ASSIGNOR TO JORDAN MACHINE COMPANY, OF PHILADELPHIA, PENNSYLVANIA, A CORPORATION OF PENNSYLVANIA.

MACHINE FOR TONGUING AND GROOVING BOX PARTS.

1,106,759.  Specification of Letters Patent. Patented Aug. 11, 1914.

Application filed October 4, 1913. Serial No. 793,275.

*To all whom it may concern:*

Be it known that I, LEA P. WARNER, a citizen of the United States, and a resident of Philadelphia, in the county of Philadelphia and State of Pennsylvania, have invented a certain new and useful Machine for Tonguing and Grooving Box Parts, of which the following is a specification.

The principal objects of the present invention are to provide for automatically, accurately and rapidly tonguing and grooving box parts; to insure the formation of a couple-tongue or groove at one corner of each end of the box part according as the cutter may be arranged for that purpose; to maintain the same distance between the bottoms of the grooves in the box parts notwithstanding changes in diameter of the cutters such as are due to wear and sharpening; to insure parallelism between the tongues and a side edge of the box parts; to provide for tonguing and grooving box parts of different sizes and thicknesses; to facilitate the removal and replacement of the cutters; to provide for properly truing or positioning a stack or pile of box parts in respect to the cutters so as to attain the requisite accuracy of formation and position of the tongues and grooves in the finished box parts although the latter originally vary among themselves; and to provide an efficient, reliable and durable machine for tonguing and grooving box parts which shall in use attain the above mentioned objects and rapidly and economically produce satisfactory tongue and groove box parts of different sizes and thicknesses and possessed of the required accuracy of form.

The invention will be claimed at the end hereof, but will be first described in connection with the embodiment of it chosen from among other embodiments for the sake of illustration in the accompanying drawings, in which—

Figure 1:
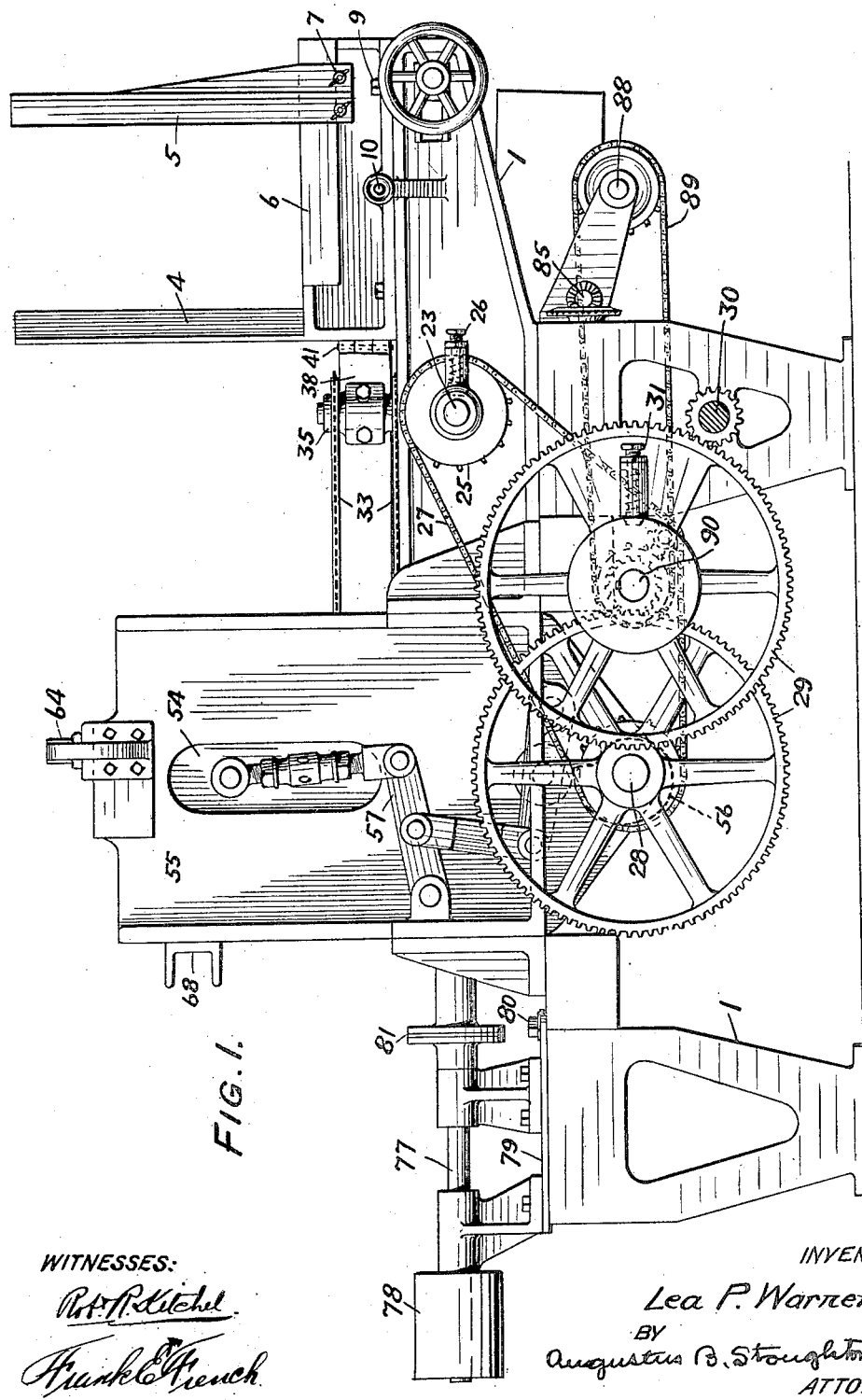
Figure 2:
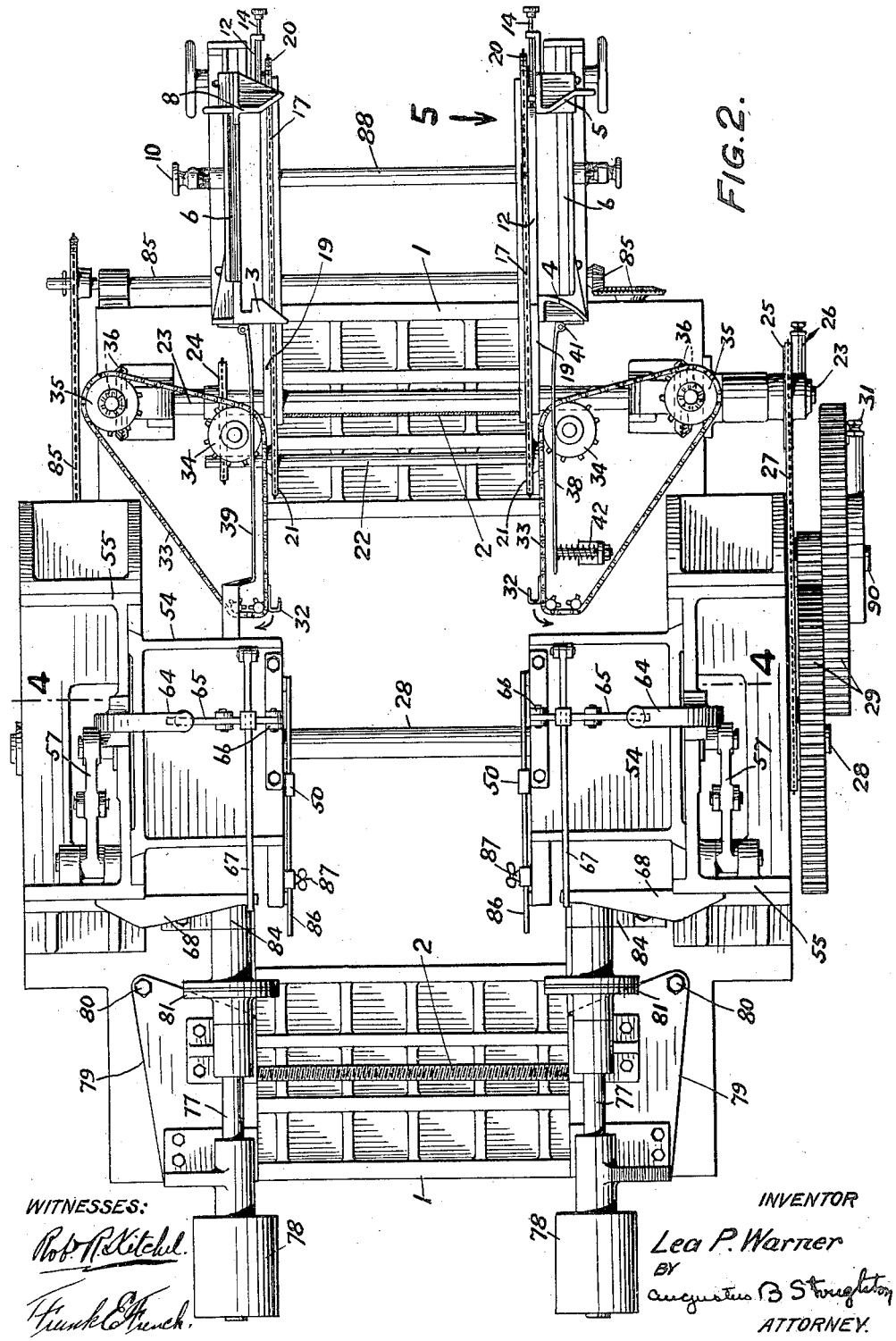
Figure 3:
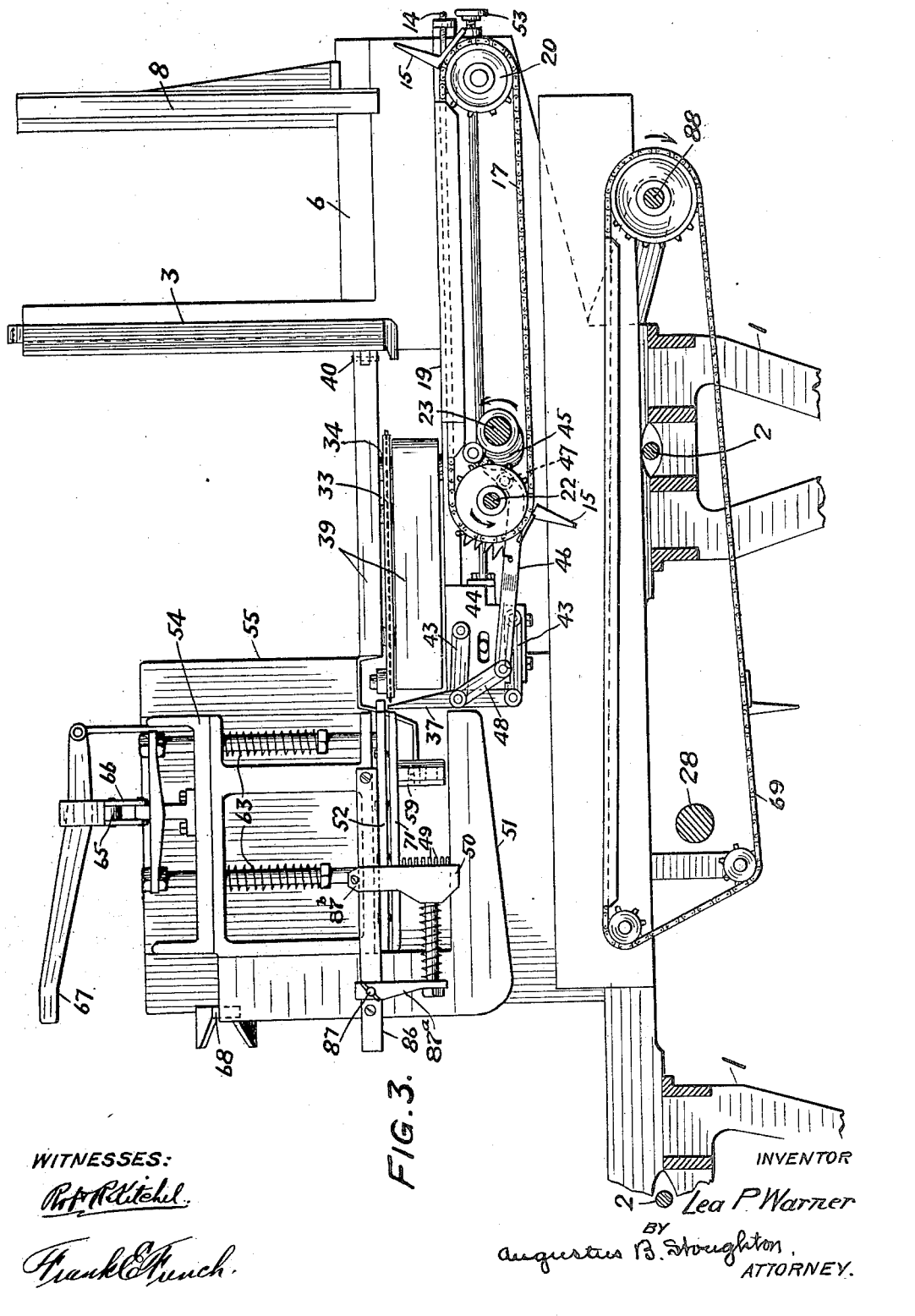
Figure 8:
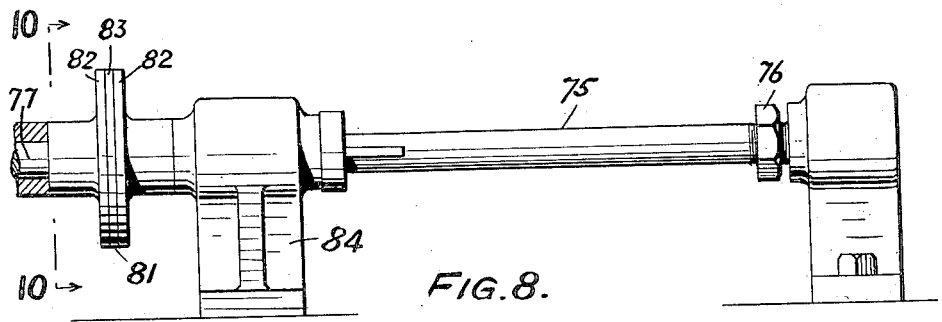
Figure 9:
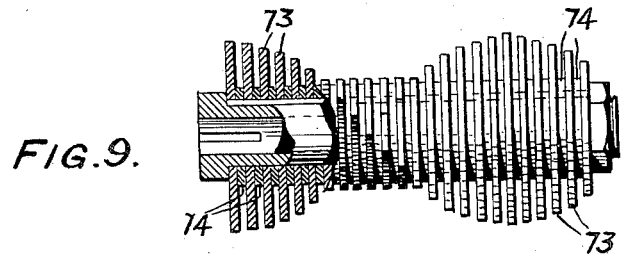
Figure 10:
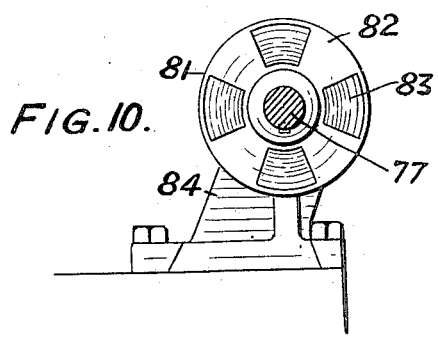
Figure 11:
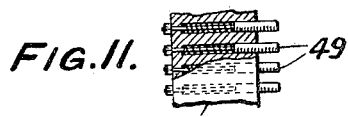

Figure 1, is a side view of a machine embodying features of the invention. Fig. 2, is a top or plan view. Fig. 3, is a longitudinal section. Fig. 4, is a transverse section on the line 4—4 of Fig. 2. Fig. 5, is an elevation view drawn to an enlarged scale of a part of the right-hand end of the machine, as shown in Fig. 2 looking in the direction of arrows 5. Fig. 6, is a sectional view taken on the line 6—6 of Fig. 5. Fig. 7, is a sectional view taken on the line 7—7 of Fig. 5. Fig. 8, is a detached view illustrating the cutter shaft. Fig. 9, is a view illustrating a portion of the cutter. Fig. 10, is a sectional view taken on the line 10—10 of Fig. 8, and Fig. 11, is a detail view of a part shown at the left-hand side of Fig. 3.

All of the parts of the machine are not shown in each figure of the drawings because in this way the parts that embody the invention can be most clearly illustrated.

There is a base 1, which may be regarded as generally rectangular and which carries the various parts of the machine. Generally speaking the parts on each side of the machine are substantially the same, so that in many instances a description of one side will serve for both sides. One side, shown at the bottom of the sheet in Fig. 2, is fixed to the base, and the other side shown at the top of the sheet in Fig. 2, is movable on the base. Screws 2, are provided for this purpose and the object is to adjust the sides toward and away from each other to accommodate the machine to box parts of different lengths. At the inlet or feed end, right-hand end in Figs. 1 and 2, are four standards, two on one side of the machine and two on the other, constituting a hopper or magazine for holding a pile of boards cut approximately to the size of the box parts. The standards 3 and 4 are fixed longitudinally to the opposite sides of the machine, which can be adjusted toward and away from each other. The standard 3, is a corner guide for one end of the boards, and the standard 4, is a guide past which the boards are slid so that the boards are fed in endwise from the side of the machine, shown at the bottom of the sheet in Fig. 2. The standard 5, is like the standard 4, but is slidably adjustable on a rail 6, Fig. 7, endwise of the machine by means of a set or binding screw 7. In this way the space between the standards 4 and 5, may be increased or diminished to admit boards of greater or less width. The standard 8, is like the standard 3, and is made adjustable in the manner last described in connection with the standard 5. The rail 6, Fig. 7, carrying the standard 5, and also the standard 4, is adjustable crosswise of the machine, Fig. 7, by means of the clamping nut 9 and screw 10. This cross-wise adjustment accommodates boards of different lengths. The bottom of the hopper consists of side pieces 12, connected with the frame of the machine by pins and inclined grooves 13, and by means of hand screws 14. So that by turning the hand screws, the side pieces 12, may be moved endwise and in so moving are raised or lowered by the inclined slot-and-pin connection 13. The purpose of this is to place the pile of boards at such elevation that the middle part of the top board $a$, Fig. 5, comes opposite the top edge of a feeder 15. In this way the required number of boards is taken from the bottom of the pile by the feeder 15, even if the boards vary in thickness.

16, are adjustable spring stops mounted on the standards 3 and 4, and their purpose is to retain all the boards in the hopper above the board $a$, which is engaged by the feeder 15 and further by yielding to permit the top board to get out even if it should be warped. There are two feeders 15, and they are carried by a chain 17. The feeders push the boards off the beveled ends 18, of the side pieces 12, so that the boards then travel on ways 19. The chains 17, are in duplicate one on each side of the machine and run in suitable grooves. These chains run around idlers 20, Fig. 3, and are driven by wheels 21, fast to a shaft 22. The shaft 22, is connected with the shaft 23, by sprocket gearing 24. The shaft 23, is connected with the wheel 25, by a spring plunger 26, which ordinarily causes the wheel and shaft to be connected and to turn together, but which can yield and thus disconnect the parts so that it is a safety connection which by yielding prevents injury if the boards and parts driven by it should jam. The wheel 25, is driven by a sprocket chain 27, from the cam shaft 28, which is driven through the reducing gears 29, from the drive shaft 30.

31, is a safety device similar to 26, so that in case any of the parts of the machine jam, power will not be applied to it.

So far as described a pile of boards is traveling along the ways 19, and is being propelled by feeders 15, operating on the outer side edges of the boards. Feeders 32, carried by endless belts or chains 33, running in a horizontal plane, continue the travel of the boards. These chains 33, run around guide pulleys 34, and are driven by wheels 35, which are driven from the shaft 23, by bevel gearing 36. The purpose of this is to get the boards forward past the gages 37, Fig. 3. It may be said that the feeders 32, travel faster than the feeders 15, and the feeders 32, thus push the pile of boards forward and cause them to clear the feeders 15, which are thus free to turn down around the wheel 21. The pile of boards is thus kept straight, or more accurately, the front and rear edges of the pile of boards are kept straight.

38 and 39, are end guides for the pile of boards and they true up the ends of boards of the pile as the boards are traveling along the ways, being propelled by the feeders 32, to a position in advance of the gages 37. The feeders 32, since they turn around vertical axes leave the boards of the pile in proper alinement. The guide 39, is pivoted at 40, to the standard 3, and the other end of the guide 39, is connected with some fixed part of the machine, or more accurately, with some part of one side of the machine, Fig. 4. The other guide 38, is pivoted at 41, to the standard 4, and is acted upon by an adjustable spring 42, so that the guides are automatically adjusted when the length of the hopper is adjusted and they have a spring acting which assists in lining up the ends of the boards of the pile. Each gage 37, is pivotally connected to links 43, and the links 43, are pivoted to an adjustable block 44. This makes what is called a floating support for the gages. There is a cam 45, on the shaft 23, and it operates on one end of a spring pressed cam lever 46, pivoted at 47, and having its other end connected by a link 48, with the gage 37. In consequence of this, as the cam rotates the gages 37, are dropped to permit the pile of boards to be pushed by the feeders 32 against the group of fingers 49, individually spring supported in a head 50, which is also spring supported. Thereupon the gages 37 come up back of the boards and hold them. The result of this is that the boards of the pile, having respect to their side edges or more accurately to one of their side edges, are accurately lined up with their end parts in position between the open clamps 51 and 52. The blocks 44, are adjustable by means of hand screws 53, and their adjustment determines the position in which the pile of boards is presented to the open clamps. The head 50 is adjustable on the bar 86 by means of the thumb screw 87, to accommodate boards of different widths. The bracket 87$^a$, Fig. 3, has an opening through which the part 86 can slide. The point of the wing-nut 87 clamps and unclamps the part 86.

87$^b$ is a guide or trolley roller.

The clamps are carried by a rising and falling member or slide 54, slidably connected with an upright 55, fixed to the side of the machine. The slide 54, is moved up and down by a cam 56, on the shaft 28, which cam is connected through a system of links and levers 57, with the slide 54. It has been said that the boards of the pile are alined edgewise by the fingers 49, and gage 37, but they are held by those parts with sufficient looseness for permitting the movable end gage 58, Fig. 4, to line them up endwise in respect to the end gage 59. The end gage 59, is adjusted by the screw 60, and the end gage 58, is moved through a spring by the cam lever 61, operated from a cam 62, on the shaft 28. The clamping jaw 52, is movable in respect to the slide 54, but this is not the case with the clamping jaw 51. When the member 54, is in high position, as shown in Fig. 4, springs 63 are restrained by the stop 64, on the upright 55, which stop 64, operates upon a lever 65, connected by a link 66, with the member that carries the clamp 52, so that as soon as the part 54, descends or starts to descend, the clamps under spring pressure clamp the pile of boards. When the part 54, is in its low position, the lever 67, connected by a link with the lever 65, strikes a stop 68, on the upright 55, Figs. 2 and 3, and thus retracts the clamp 52, to free the pile of boards, which is then led from the machine on the endless belt 69, Fig. 3, driven from the shaft 88, which in turn is driven by the chain 89, Fig. 1. This chain connects with a sprocket wheel on the shaft 90. The clamp 52, has a hard fiber laterally projecting face 70, through which the cutters cut slots and it also has a spring face 71. These faces insure the cutting of sharp clean tongues and grooves and avoid any injurious effects that might be due to splinters. The cutters 72, rotate about fixed axes and cut the grooves in the ends of the boards of the pile as it is fed downward. The cutters are shown to consist of knives 73, arranged with washers 74, between them and keyed spirally on a sleeve Fig. 9, removably mounted on the shaft 75, from which they can be readily detached since they are clamped thereon by the nut 76. The cutter drive-shafts 77, are independently driven as by pulleys 78. These drive-shafts 77, are mounted in bearings carried by the plates 79, which can be moved, as by turning them around the bolts 80, so as to clear the cutter shaft 75, and this permits of the convenient removal of the latter from the machine, for grinding or repairs. The couplings 81, between the shafts 75 and 77, permit of this, and these couplings are shown to consist of perforated plates 82, having between them a leather 83, with projections taking into the perforations. In this way a certain resiliency is provided. One of the bearings, for example, the bearing 84, for the cutter shaft would come out with the shaft 75, when it is removed from the machine, as described. 85, is a gear that may be operated by hand or by power, and it serves to turn the screws 2, and thus adjust the width of the machine.

In use a pile of boards is taken from the bottom of a stack of boards in the hopper by the feeders 15. The relative height of the top of the feeders and of the rail 12 being such that this is properly accomplished even if the boards vary somewhat in thickness or are warped. The pile of boards is then transferred to the feeders 32 which push it along into range of the open clamps 51—52 of the gages 37 and 49 and of the gages 58 and 59. As the pile of boards travels along it is alined endwise against the guide 39 by the spring guide 38. The ringers 49 operate upon the individual boards of the pile so that one of the side edges of the boards is trued against the guides 37. The guide 58 trues one of the end edges of the boards against the guide 59. One corner of the pile of boards is positioned by the guides 59 and 37, which are at right angles in respect to each other, so that the whole pile is so placed that when fed to the cutters by the clamps 52 and 51, the bottoms of the grooves are the proper distance apart and at one corner there is either a complete tongue or a complete groove. It is of course to be understood that the guides 37 and 59 are adjusted properly in respect to the working faces of the cutters. The clamps automatically clamp the pile with a spring pressure and after the grooves are cut, automatically release the pile which is delivered from the machine by the conveyer 69.

What I claim is:

1. In a machine of the type described, the combination of cutters, clamps for feeding the ends of a pile of box parts to the cutters, side and end gages in proximity with the clamps and including spring fingers for truing the boards individually, feeders acting in a horizontal plane for delivering the pile to the gages, and feeders for taking the pile horizontally from the bottom of a stack and delivering it to the first mentioned feeders, and means for operating said parts.

2. In a machine of the type described the combination of cutters, a slide having the fixed and the movable elements of a spring clamp, a pair of levers having free ends spaced apart and pivotally connected with each member of the clamp, fixed stops respectively in line with the end of one of the levers for operating the clamps when the slide is up and down and for permitting it to close when the slide is passing the cutters, means for feeding a pile of boards to the clamps and for positioning the pile in respect to the operative parts of the cutters.

3. A machine of the type described comprising the combination of a bottom feed hopper, means for adjusting the walls thereof to compensate for warped and varying boards, feeders operating in a horizontal plane to feed a pile of boards from the hopper, feeders operating in a horizontal plane more rapidly than the first mentioned feeders to receive the pile of boards from the first mentioned feeders and carry it clear thereof while maintaining the alinement of the boards, end-guides for the boards in proximity with said feeders, a group of independent spring fingers against which the pile of boards is fed by said feeders, a gage for holding the pile of boards in respect to said fingers, means for raising and lowering the gage to permit of the passage of the boards, end guides in proximity with said fingers and gage, a reciprocating carrier for receiving the boards from the fingers and guiding and carrying them past the cutters, mechanism actuated by the travel of the carrier and adapted to open said clamp, cutters, and driving means for said parts.

4. In a machine of the type described, the combination of cutters, opposed clamps for feeding to the cutters, an end gage outside of and opposite each clamp and whereof one is movable, a group of independent movable spring fingers inside each clamp and at right angles with the first mentioned gages, means for feeding a pile of boards to the spring fingers and in respect to the end gages, and devices for operating said parts, substantially as described.

5. In a machine of the type recited, the combination of clamps, means for opening and closing the clamps, means for feeding a pile of boards between the open clamps, a pair of gages against which one end and the adjacent side of the boards are pressed to true the pile while in the open clamps, movable gages acting upon the other end and its adjacent side of the boards, and means for operating said parts, substantially as described.

LEA P. WARNER.

Witnesses:
CLIFFORD K. CASSEL,
FRANK E. FRENCH.

Copies of this patent may be obtained for five cents each, by addressing the "Commissioner of Patents, Washington, D. C."